Nov. 19, 1968   N. R. LEADER ET AL   3,411,682
FIXTURE FOR BREAKING OPEN EXPENDABLE
ROLL FILM CARTRIDGES

Filed Nov. 3, 1966   3 Sheets-Sheet 1

NORMAN R. LEADER
KARL K. KOLVA
INVENTORS

BY

ATTORNEYS

NORMAN R. LEADER
KARL K. KOLVA
INVENTORS

ATTORNEYS

NORMAN R. LEADER
KARL K. KOLVA
INVENTORS

BY
ATTORNEYS

United States Patent Office 3,411,682
Patented Nov. 19, 1968

1

3,411,682
FIXTURE FOR BREAKING OPEN EXPENDABLE
ROLL FILM CARTRIDGES
Norman R. Leader and Karl K. Kolva, Rochester, N.Y.,
assignors to Eastman Kodak Company, Rochester, N.Y.,
a corporation of New Jersey
Filed Nov. 3, 1966, Ser. No. 591,741
5 Claims. (Cl. 225—93)

The present invention relates to photography, and particularly to a fixture for breaking open exposed 126 roll film cartridges and capturing the spool of exposed film therein so that the film can be removed for processing.

U.S. Patent 3,260,182 which issued July 12, 1966, in the name of H. Nerwin discloses a new 126 roll film cartridge which has made instant camera loading a reality and which the breaking fixture constituting the present invention is designed to break open to provide access to the exposed film therein. This film cartridge, being an expendable item, is made of plastic or other frangible material and consists of a front member and a back member which when joined along a line of separation form in combination with a take-up spool an enclosure for a supply roll of film and an exposure aperture across which the film is advanced from the supply roll upon rotation of the take-up spool. From the time this cartridge is loaded with unexposed light-sensitive film at the factory, the photographer does not touch the film but loads the camera by dropping the cartridge into the back of an instant-load camera designed to accommodate the same. After the film is completely exposed, the photographer sends the exposed cartridge to a processor who must break the cartridge open in order to remove the film from the take-up spool for processing.

The primary object of the present invention is to provide a fixture for breaking open these cartridges which, while being simple to operate and inexpensive to manufacture, is capable of being operated by a woman in the dark without danger or personal injury.

Another object is to provide such a breaking fixture which performs its cartridge opening operation in such a manner that a minimum of chips of the cartridge material are produced which might fall onto and contaminate the film.

Yet another object is to provide a breaking fixture of the type described which captures the take-up spool of film and holds it so that after the cartridge is removed therefrom the film can be readily pulled from the spool for processing.

The novel features that we consider characteristic of our invention are set forth with particularity in the appended claims. The invention itself, however, both as to its details of construction and its methods of operation, together with additional objects and advantages thereof, will best be understood from the following description when read in connection with the accompanying drawings, in which:

Figure 5:
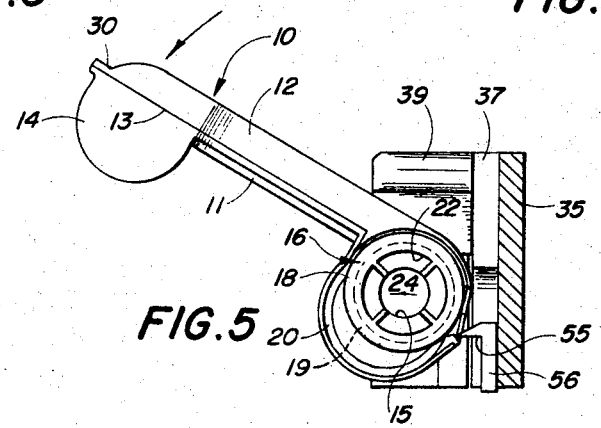
Figure 6:
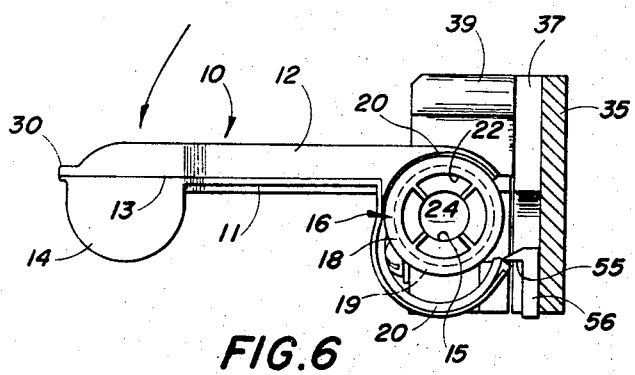

FIGS. 5 and 6 are views similar to views 3 and 4, but

Figure 7:
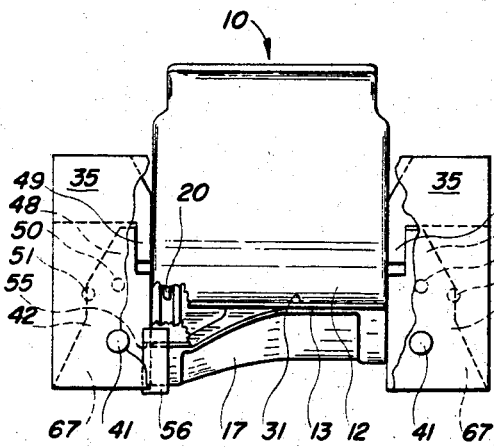
Figure 8:
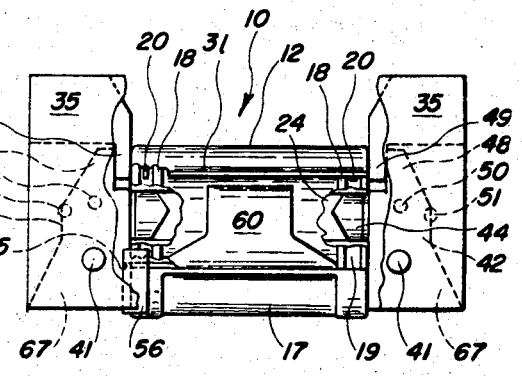
Figure 9:
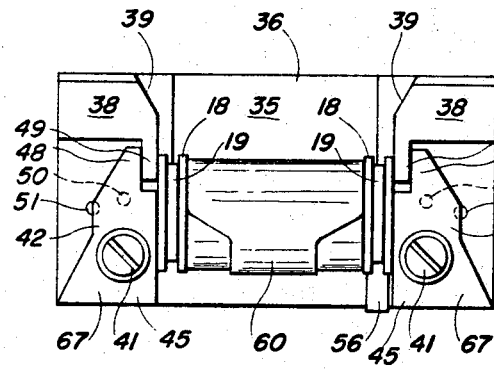
Figure 10:
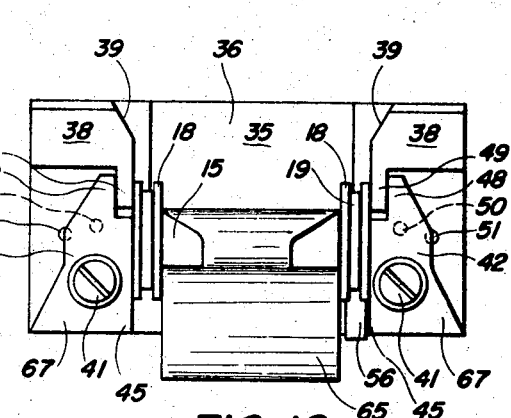
Figure 11:
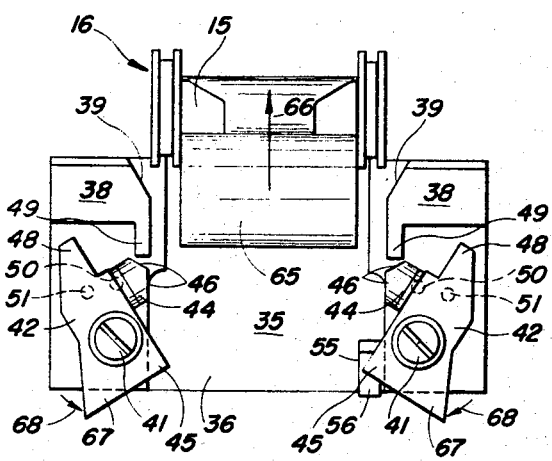

2 showing how that portion of the cartridge embracing the take-up spool is broken open and separated to pull off from the spool as pivotal movement of the cartridge progresses;

FIGS. 7 and 8 are rear views of the loaded fixture, with the stationary supporting plate broken away, corresponding to FIGS. 5 and 6, respectively, to show how the cartridge is broken away from the captured take-up spool as the cartridge is rotated throughout approximately 90° relative to the fixture;

FIGS. 9 and 10 are front views of the fixture showing first the captured spool of film after the cartridge is removed therefrom, and secondly, the take-up spool with the customary black paper leader attached thereto after the film has been pulled from the spool and detached from the leader; and FIG. 11 corresponds to FIGS. 9 and 10, but shows how the empty take-up spool with the coil of black interleaving paper attached thereto is removed from the fixture, and at which time the gripping means for the core of the take-up spool are reset to receive the next cartridge.

Figure 3:
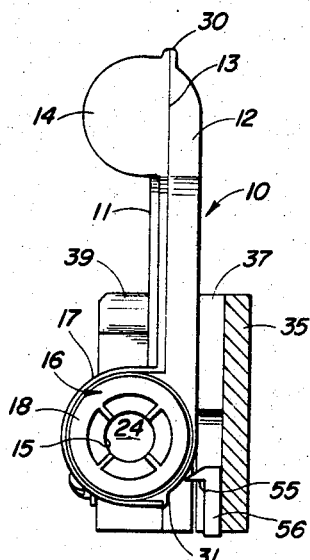
FIG. 3 is a sectional view taken substantially on line 3—3 of FIG. 2.

Since the 126 roll film cartridge which the present fixture is designed to break open is fully disclosed in U.S. Patent 3,260,182 noted above, we have shown and will describe only those features of such cartridge which are necessary to a complete understanding of the purpose and operation of the present invention. Referring to FIG. 3, the roll film cartridge 10, which the fixture of the present invention is designed to break open, is made of plastic, or some other frangible material, and comprises a front component 11 and a back component 12 which are permanently joined together by an adhesive, heat and pressure, etc., along a line of separation 13 which extends around the cartridge except at those portions of the cartridge which embrace the take-up spool as will be described. At one end of the cartridge there is formed a supply chamber 14 in which a coil of interleaved backing paper and film is located when the cartridge is loaded at the factory. The leading end of the backing paper is drawn across an exposure window, not shown, in the front component 12 and is attached to the core 15 of a take-up spool 16 rotatably mounted in a take-up chamber 17 formed at the other end of the cartridge. The film is advanced across the exposure window a frame at a time by rotation of the winding key or other film advancing means of a camera which is designed to accommodate a cartridge of this type. This means that the take-up spool 16 must be accessible to the film feeding means in the camera and at the same time the cartridge must be made light-tight around this spool. To this end, the take-up spool has relatively thick flanges 18 at each end which are provided with circumferential grooves 19. Those arcuate portions of the front and rear components of the cartridge embracing the take-up spool have inwardly extending ribs 20 which loosely extend into the circumferential grooves 19 in the spool flanges when the cartridge is assembled at the factory after being loaded with film.

This engagement between the ribs 20 on the cartridge components and the circumferential grooves 19 in each of the spool flanges serves two purposes. It rotatably supports the take-up spool in the cartridge and at the same time provides a light-tight connection between the film storing part of the take-up spool and the cartridge. In order to complete the light-tight connection between the front and rear components of the cartridge along the separation line therebetween these two cartridge components are provided with cooperating ribs and grooves, not shown, which mate with one another.

Figure 1:
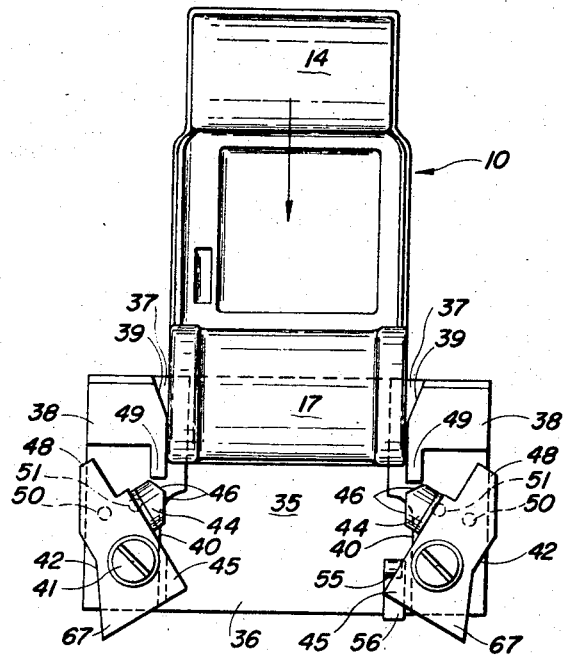
FIG. 1 is a front elevational view of a breaking fixture constructed in accordance with a preferred embodiment of the invention, and showing the movable parts thereof in a cartridge receiving condition and with a cartridge about to be introduced thereinto.
Figure 2:
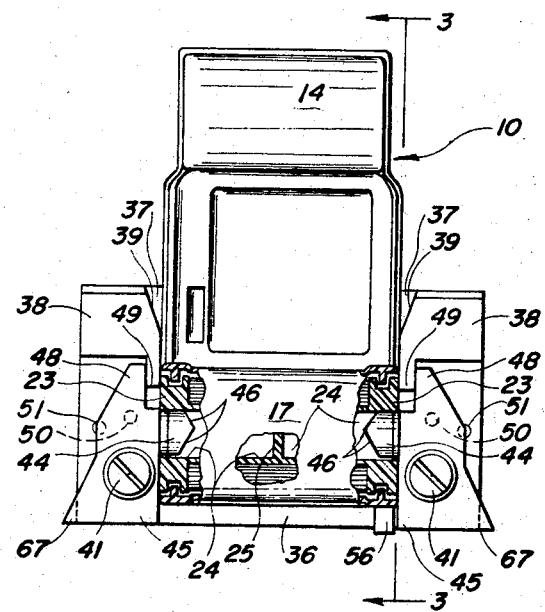
FIG. 2 is a view similar to FIG. 1 but showing the parts in a position which they assume when a cartridge is fully inserted into the fixture.
Figure 4:
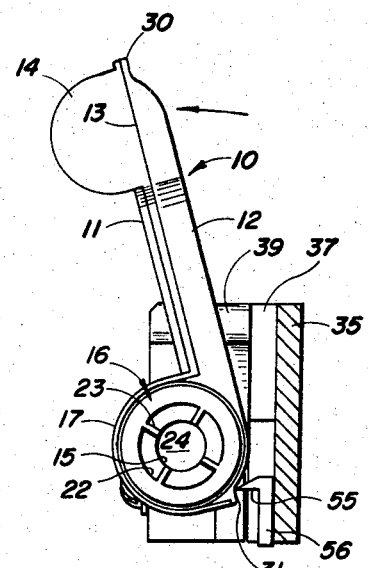
FIG. 4 is a view similar to FIG 3, but showing the upper end of the cartridge pivoted about the take-up spool axis to a position where the breaking point of the fixture is just engaging one corner of the cartridge.

For clutching the take-up spool to a camera feeding mechanism one or both flanges of the take-up spool are recessed as shown at 22, see FIGS. 4–6, and in these recesses there are located four circumferentially spaced driving lugs 23 which extend radially of the flange. These driving lugs will cooperate with a corresponding clutch member associated with the film feeding means of a camera. In order to lighten the take-up spool construction, and to save plastic material, the core 15 of the spool is made hollow, as indicated at 24, except for a strengthening web 25 which is left near the center of the core, see FIG. 2. The inner ends of the driving lugs 23 are substantially flush with the hollow interior of the core 15 so that in effect they form an extension of the bore of the core for the purpose hereinafter described. In order to avoid the difficulty of trying to make a substantially strong as well as a light-tight joint between two arcuate edges, the mating ends of the front and rear components of the cartridge are so formed as to meet in a flat, shelf-like projection at each end as indicated at 30 on the supply end of the cartridge and at 31 on the take-up end of the cartridge. The projection 31 at the take-up end of the cartridge is important to the function of the breaking fixture constituting the present invention as will be set forth hereinafter.

Coming now to the present invention, the fixture for breaking open the described film cartridge comprises a stationary support 35 which is adapted to be fixed to a horizontal table top or to a vertical wall, not shown, depending upon whether the work station with which the fixture is to be associated lends itself to the horizontal or vertical mounting of the fixture. For purposes of this disclosure it will be assumed that the fixture is vertically mounted as shown in FIGS. 1–6. On the front face of the support 35 a vertically extending guideway 36 is provided for receiving a cartridge 10 when slid downwardly thereinto in endwise relation take-up spool end first, see FIG. 1. This guideway is formed by a pair of spacer plates 37 fixed to the face of support 35 in spaced relation and which support the longitudinal edges of the rear component of the cartridge as it is slid into the guideway. Fixed to the top surface of the spacer plates 37 are a pair of edge guides 38 which are spaced apart so as to slidably engage the opposite edges of the cartridge as it is slipped into the fixture. The leading corner of each edge guide 38 is cut back as shown at 39 to open up the entrance to the gateway to facilitate endwise insertion of the cartridge into the gateway in total darkness. The facing edges of the spacer plates 37 are cut away as shown at 40, FIG. 1, to allow the cartridge 10 to be pivoted relative to the fixture as will be set forth below.

Pivoted at 41 to the top of each of the spacer plates 37 at opposite sides of the guideway 36 is a right-hand and left-hand spindle support member 42. These two spindle supports are adapted to swing between the cartridge receiving position shown in FIG. 1 and a cartridge capturing position shown in FIG. 2 in response to insertion of the cartridge into the fixture. Looking at FIG. 1 it will be seen that when the spindle support members 42 are in their cartridge receiving position a spindle 44 on each member 42 is removed from the guideway 36 and a projection 45 beyond the pivot point of the members 42 extends into the guideway 36. When a cartridge 10 is inserted into the guideway 36 the take-up spool end engages the projection 45 and pivots the support members 42 to a position wherein the spindles 44 thereon engage opposite ends of the take-up spool 16 and thus capture the cartridge. The spindles have an outside diameter which is slightly less than the inside diameter of the hollow core 15 of the take-up spool and have tapered ends 46 the corners of which are somewhat rounded to allow the spindles to radially pivot into and out of the bore of the spool formed by the driving lugs 23. It will be noted in FIG. 2 that the taper on the lower side of each spindle is more pronounced than that on the upper side and that the apex between the two is slightly above the axis of the takeup spool. This relationship is necessary with the compact arrangement of parts shown in order that in the cartridge receiving position of the spindle supports the spindles will leave the guideway 36 completely open for the insertion of a cartrdidge, see FIG. 1. Movement of the spindle supports to their cartridge receiving positions, FIG. 2, in response to the insertion of a cartridge into the guideway is limited by the engagement of an arm 48 on each spindle support with a projection 49 on the associated edge guide 38. The spindle supports 42 may be frictionally retained in both of their two positions by a spring-pressed ball 50 engaging one or the other of two ball detents 51 arcuately spaced about the pivot points 41. The spring-pressed ball 50 and the two ball detents 51 can be respectively located in either the face of the spacer plates 37 or the face of the spindle supports 42 adjacent thereto.

After a cartridge has been fully inserted into the fixture and the take-up spool thereof is captured by the spindles 44, the other end of the cartridge extends above the fixture and can be grasped by hand to be pulled down and away from the support, as shown in FIGS. 3–11, to break open the cartridge so that it can be removed from the take-up spool which remains captured by the spindles 44. During this movement the cartridge either pivots on the flanges of the take-up spool 16 or the take-up spool pivots on the spindles 44, depending upon which ever of these two pivot points is the most free. In either case the cartridge pivots relative to the stationary parts of the fixture about the axis of the take-up spool.

During the first few degrees of the downward pivotal movement of the cartridge the cartridge moves freely and can be readily accelerated. When the cartridge reaches the position shown in FIG. 4 one corner of the projecting shelf 31 of the cartridge is about to strike the sharp edge 55 of a stationary breaker point or knife 56 which is fixed to the face of the stationary support 35 between the spacer plates 37. If the cartridge is moved to and through this position with a rather quick stroke the sharp edge 55 of the breaker point will break the corner of the back component away and thus rupture the seal between the front and back components of the cartridge at this point. Further downward movement of the cartridge, which now requires slightly more pressure because the breaker point is holding the front component from further pivotal movement, will cause the back component of the cartridge to swing away from the front component and hence rip the seal along the separation line 13 between the two cartridge components. This condition is shown in FIGS. 5 and 7. Finally, the cartridge will reach a point, usually 90° from the loading position as shown in FIGS. 6 and 8, where that part of the back component of the cartridge embracing the take-up spool is separated from the front component of the cartridge by a sufficient amount that the cartridge can be pulled off the take-up spool 16 by pulling it in a direction radially of the spool.

This leaves the take-up spool 16 with the film wound thereon captured by the spindles 44 as shown in FIG. 9. Now the end 60 of the film or the end of a black interleaving paper leader, as the case may be, can be grasped and pulled outwardly to readily remove the film from the spool for further handling, e.g., splicing to a roll of other film strips for continuous processing. If the film on the spool is one which is interleaved with black paper, as is customary in roll films for purposes of light protection of the film, then when the film has been pulled off the spool and separated from the interleaving paper, the paper which is attached to the core of the spool will remain as a coil of paper 65 attached to the spool core, see FIG. 10. The take-up spool with only the coil of black interleaving paper attached thereto can now be removed from the fixture in one of two ways as indicated in FIG. 11. The spool can be grasped between the flanges by the operator and jerked upwardly in the direction of arrow 66 with a force sufficient to overcome the detent action of balls 50 acting on the spindle supports 42. By virtue of the arrangement of the spindles 44 relative to the pivots 41 this upward force will cause the pivoted spindle members 42 to move to an open position wherein the spindles 44 free the ends of the spool and the fixture is reset for the insertion of another cartridge. Or the remote corners 67 of the spindle supports 42 can be grasped between the thumb and forefinger and squeezed together in the direction shown by the arrows 68 in FIG. 11 to remove the spindles 44 from the ends of the spool core, in which case the spool can be lifted right out of the fixture at right angles to the guideway.

While only one breaker point 55, 56 has been shown at a position to engage one corner of the cartridge, it is noted that two breaker points, one to engage each corner of the cartridge, could be used. It has been found, however, that with one breaker point located as shown, the opening of the cartridge is easier than when two spaced breaker points are used. This is probably due to the fact that with one breaker point the seal along the line of separation between the two components of the cartridge is ruptured first at one corner and then further pivotal movement of the cartridge produces a twisting action on the end of the cartridge which splits the seal along the line of separation between the cartridge components. It will be appreciated that using this manner of opening the cartridge results in a minimum of chips of plastic which might fall onto the film and possibly damage it, a condition which has been prevalent with previously used cartridge opening devices where a crushing force applied to the complete width of the cartridge has been used to break it away from the take-up spool. The manner in which the cartridge is opened by the present fixture results in the cartridge being removed from the take-up spool in one piece whereby a clean work place is obtained because the problem of disposing of the broken-open cartridge involves the handling of only a single piece. Since the take-up spool is rotatably captured on the spindles after the cartridge is removed therefrom, it is easy for the operator, who works in total darkness, to find the end of the trailing strip of black interleaving paper by which one end of the film is attached to the core of the spool and by pulling on this strip to gain access to the trailing end of the film. After the trailing end of the film is separated from the paper strip by pulling on it, the film and paper strip will be pulled from the spool, the paper strip coiling up and remaining attached to the spool to be disposed of along with the empty spool. As mentioned above, the film strip can be spliced to the end of a series of other films spliced in end-to-end relation and taken up on a driven wind-up roll for continuous processing, or each film strip can be processed individually. If the film is spliced to the end of a group of films taken up on a wind-up roll, the drive of the wind-up roll can serve to pull the film and backing paper from the take-up spool while it is captured by the spindles 44 so that the operator does not have to worry about handling a long strip of film in the dark.

While we have shown and described specific embodiments of our invention, we are aware that many modifications thereof are possible. Our invention, therefore, is not to be limited to the precise details shown and described but is intended to cover all modifications coming within the scope of the appended claims.

We claim:

1. A fixture for breaking open a frangible film cartridge having a take-up spool rotatably mounted therein at one end thereof, said spool having a core whose opposite ends are accessible from the outside of the cartridge, and comprising, a stationary support including a guideway open at one end to receive a film cartridge slid thereinto take-up spool end first and open at the side opposite the support so that a cartridge slid thereinto can be pivoted about the spool axis away from the support, means movably mounted on said support adjacent said guideway and responsive to the insertion of a cartridge into said guideway for gripping the ends of the core of said take-up spool so that the free end of said cartridge can be pivoted about the axis of said spool and away from said support, and at least one breaker point fixed to said support and extending into said guideway to engage and break said cartridge at a point adjacent said take-up spool during the first part of the pivotal movement of said cartridge about said spool axis and thereafter hold that part of the cartridge engaged thereby while the remaining part of the cartridge is pivoted away therefrom to break open that part of the cartridge surrounding said spool sufficiently to allow removal of the cartridge from said spool while it remains captured by said core gripping means.

2. A fixture for breaking open a frangible cartridge according to claim 1, in which said core gripping means engages said core ends in such a way as to allow rotation of the spool relative thereto so that material wound on said spool can be removed by merely pulling it from said spool while the spool remains captured by said gripping means.

3. A fixture for breaking open a frangible cartridge according to claim 1, including means for selectively moving said core gripping means from engagement with the ends of said core so that said spool can be removed from the fixture.

4. A fixture for breaking open a frangible cartridge according to claim 1 in which said core gripping means comprises a right-hand and a left-hand spindle support, one of said spindle supports pivotally mounted on said stationary support adjacent one side of said guideway and the other spindle support pivotally mounted on said stationary support adjacent the other side of said guideway and in line with said first spindle support to move between a cartridge receiving position, wherein a portion of each spindle support beyond the pivot point thereof extends into said guideway, and a core capturing position, wherein said portion of each spindle support is pivoted out of said guideway in response to insertion of a cartridge into said guideway; and a core gripping spindle fixed to each spindle support ahead of the pivot point thereof which are moved into gripping relation with opposite ends of said spool core when said spindle supports are moved to their cartridge capturing position.

5. A fixture for breaking open a frangible cartridge according to claim 4 and including a detent means between each spindle support and said stationary support for frictionally retaining each of said spindle supports in at least one of their two positions of movement.

References Cited

UNITED STATES PATENTS 2,853,906    9/1958    Pesta _____ 225—93

J. M. MEISTER, *Primary Examiner.*